United States Patent

[11] 3,548,775

| | | |
|---|---|---|
| [72] | Inventors | Clarence H. Hammond<br>Longmont, Colo.;<br>Kurt Horn, Azusa, Calif. |
| [21] | Appl. No. | 785,290 |
| [22] | Filed | Dec. 19, 1968 |
| [45] | Patented | Dec. 22, 1970 |
| [73] | Assignee | Honeywell Inc.<br>Minneapolis, Minn.<br>a corporation of Delaware. |

[54] CONTROL APPARATUS
10 Claims, 6 Drawing Figs.

| | | |
|---|---|---|
| [52] | U.S. Cl. | 114/144 |
| [51] | Int. Cl. | B63h 25/42 |
| [50] | Field of Search | 114/144B |

[56] References Cited
UNITED STATES PATENTS
3,187,704   6/1965   Shatto et al.................. 114/144

*Primary Examiner* — Andrew H. Farrell
*Attorney* — Charles J. Ungemach, Ronald T. Reiling ABSTRACT: A system for providing thrust levels from zero to approximately 90 percent of total thrust capacity in any given direction with respect to the axis of a ship or vessel. This complete variability in thrust is obtained even though thrusters are used which idle at approximately 10 percent of maximum thrust. The inventive concept may be practiced in many different embodiments and is shown for illustrative purposes as a simple mechanical block diagram.

INVENTORS
CLARENCE H. HAMMOND
KURT HORN
BY Bruce C Lutz
ATTORNEY

CONTROL APPARATUS

THE INVENTION

The present invention pertains generally to ship control apparatus and more specifically to apparatus for controlling the thrusters of a vessel so as to provide completely variable thrust in any horizontal direction with respect to the center line of the vessel.

While there are prior art dynamic ship positioning systems, a majority of these systems utilize electric motors for the propulsion thrust means. The electric motors have an advantage in that their thrust can be reduced to zero but have other problems in terms of cost, efficiency and overall useability. In most instances the electric motors were utilized as only dynamic ship positioning means and were not used to actually propel the ship to and from the point of origin.

It therefore became somewhat mandatory that internal combustion engines be used to provide the propulsive power both for normal ship movements and for dynamic ship positioning. However, internal combustion engines have a problem in that the thrust cannot be reduced below a minimum, which in one embodiment was approximately 10 percent of maximum thrust, without stopping the engine. One solution to this problem of a minimum thrust component has been provided in a copending application Ser. No. 687,235, now Pat. 3,481,299, which was filed Dec. 1, 1967 and assigned to the same assignee as the present invention. However, the system disclosed in the referenced application is more efficient in one direction of travel than it is normal to that direction and therefore is more applicable to a streamlined vessel such as a ship than it is to an oil drilling barge or other vessel which is substantially as hard to move in the forward direction as it is in a side direction.

Therefore, the present invention comprises a method of originally positioning and subsequently repositioning the engines and modulating the thrust in accordance with the repositioning so as to obtain approximately 90 percent of maximum thrust in any given horizontal direction with respect to the center line of the ship and still provide zero thrust under idle conditions. This is accomplished by positioning each of the thrusters so that the two front thrusters point in opposite directions at idle and the front and rear thrusters on a given side of the vessel point in opposite directions at idle with no moment components. As the thrust is increased, the direction of the thrusters is moved from the idle position toward a position which is parallel with the desired direction of movement.

To obtain rotation of the vessel, the front and rear thrusters are differentially rotated to obtain the desired moment component. When no translation is required, the total sideways and forward components are balanced and the ship merely rotates on its center of gravity. The rotation is caused because the center of thrust is situated away from the center of gravity and thus there is a moment arm produced which rotates the ship. This occurs whether the vessel is moving in translation or not.

It is, therefore, an object of the present invention to provide a more efficient dynamic ship positioning system.

Other objects and advantages of the present invention may be ascertained from a reading of the specification and claims in conjunction with the drawings wherein:

Figure 1:
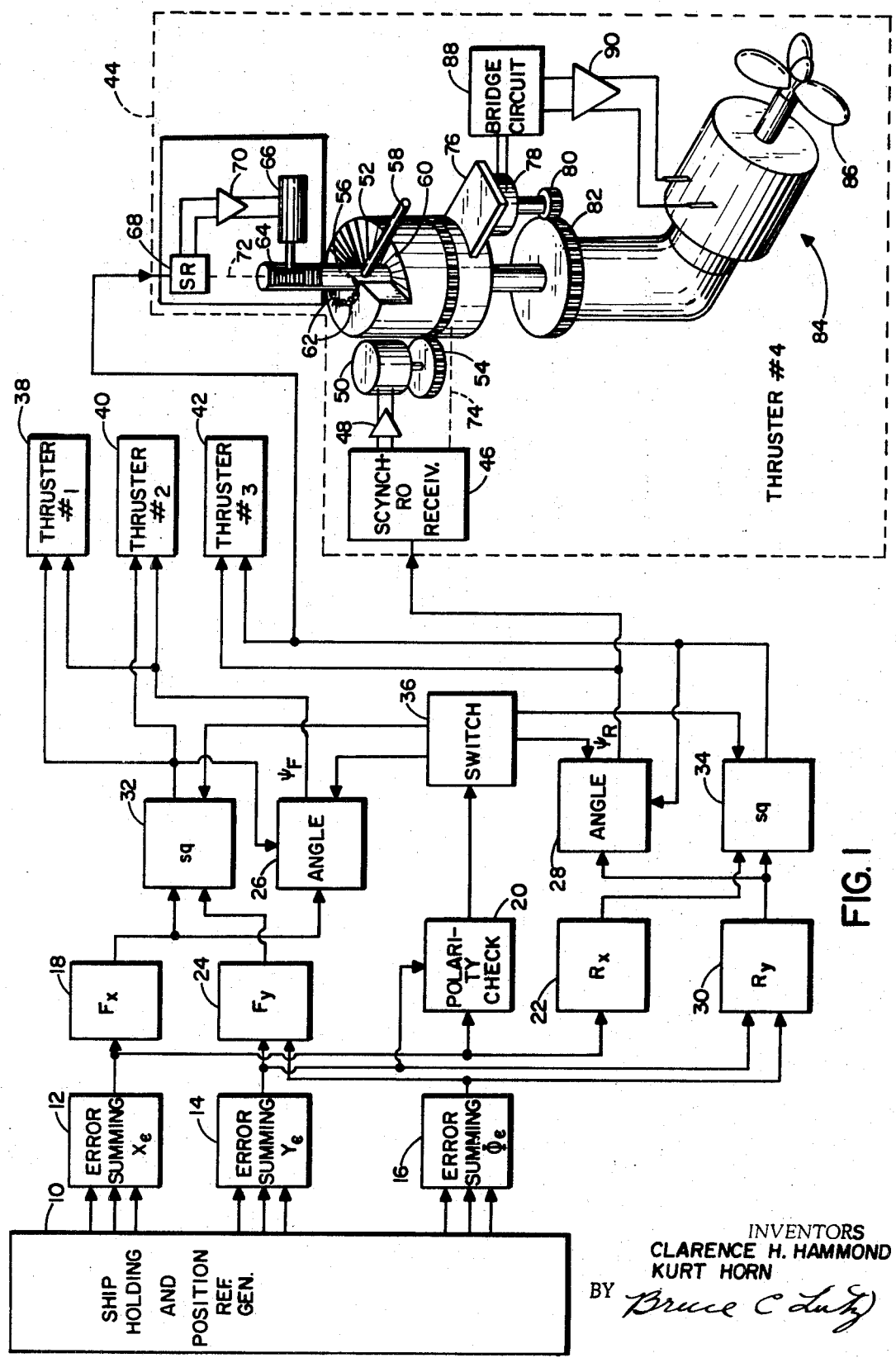
FIG. 1 is a mechanical block diagram of one embodiment of the invention.

Referring to FIG. 1 a ship holding and position reference generator 10 supplies a plurality of X component error signals to an error summing means 12. These signals may be indicative of wind, water currents and other items. The generator may be very similar to that found in the previously referenced application. The generator 10 also supplies a plurality of Y component inputs to an error summing means 14 and moment components to an error summing means 16. Block 12 supplies signals to a buffer amplifier and front X proportioning unit 18 as well as to a polarity checking circuit means 20 and a rear proportioning unit 22. The summing means 14 supplies signals to the front Y block or proportioning unit 24 as well as supplying signals to the polarity check means 20. Block 14 further supplies signals to a rear Y proportioning units 30 which also receives inputs from block 16. Block 16 further supplies signals to block 24. The outputs of the two blocks 18 and 24 are supplied to a squaring circuit means 32 while the outputs of blocks 22 and 30 are supplied to a squaring circuit means 34. The squaring units are similar to blocks 26 and 30 in the above-referenced application and are utilized to provide resultant vector signals indicative of the inputs thereto.

The output of block 18 is also supplied to an angle block 26 while the output of proportioning block 30 is supplied to an angle block 28. These angle generating blocks may be similar to the angle means 28 in the above-referenced application. The polarity check circuit, which may be comprised of a pair of Schmitt triggers supplying their outputs through isolating capacitors and an integrating circuit, supplies a signal to an inverse logic switch means 36 whenever one or both of the inputs changes in polarity. The switch 36 controls each of the blocks 26, 28, 32 and 34 so as to change the effect of their outputs when the idle position of the thrusters changes by more than 90°.

The output from squaring circuit 32 is supplied to angle block 26 and also to thrusters 1 and 2 which are respectively labeled 38 and 40. The output from the angle block 26 is also supplied to blocks 38 and 40. The output from the angle block 28 is supplied to thrusters 3 and 4 which are labeled respectively 42 and 44 while the output from squaring block 34 is supplied to block 28 and is also supplied to these same two thrusters 3 and 4. All of the thrusters 1 through 4 contain the same apparatus and only thruster 4 is shown in detail for purposes of simplicity.

The output from block 28 is supplied to a synchro receiver 46 whose output is supplied through an amplifier 48 to a motor 50. A drum 52 is driven by motor 50 via gear 54. The drum 52 has a shaft 56 slideably engaged through the center thereof with an arm 58 extending therefrom. Arm 58 rides on cam surface 60 and is held at a central position by biasing means or springs 62. The arm 58, as a result of riding on cam 60, will move the shaft 56 upward or downward as it rotates a maximum of 90° either way from its rest or 90° position. The shaft 56 is driven vertically via a gear 64 attached to a motor 66. An output from the squaring circuit 34 is supplied to a servo receiver 68 within block 44 which supplies an output to an amplifier 70 which drives the motor 66. There is feedback from the shaft 56 to the servoreceiver 68 as represented by dash line connection 72. There is also feedback from the drum 52 to the servoreceiver 46 as represented by dash line connection 74.

Extending from the drum 52 is an arm 76 which has mounted thereon a potentiometer 78. On a shaft of potentiometer 78 is a gear 80 which is engaged with a gear 82 mounted on a lower extremity of shaft 56. The gear 82 does not move vertically with shaft 56 but will rotate as shaft 56 rotates due to movement of arm 58 on the cam 60. The shaft 56 moves a thruster, which in most cases will be an internal combustion or diesel engine generally indicated as 84, which drives a propeller or other propulsion means 86. A bridge circuit 88 is connected to the potentiometer 78 so as to supply an output to an amplifier 90 in response to displacement of shaft 56 from rest position. The signal from amplifier 90 is supplied to the thruster 84 to increase the speed of operation of the thruster.

Figure 2:
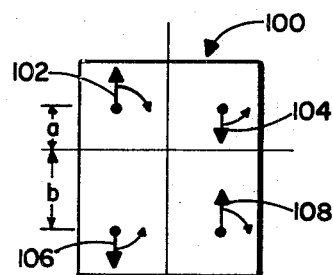
FIGS. 2 through 6 are representations of a vessel showing various positions of the thrusters situated thereon and the directions in which they would turn for movement of the vessel.

In FIG. 2 a platform or vessel generally indicated by reference numeral 100 has thrusters 1, 2, 3 and 4 mounted thereon and positioned as indicated by arrows 102, 104, 106, and 108 respectively. The thrusters 102 and 104 are the front thrusters and are located $a$ distance from the center of gravity while thrusters 106 and 108 are located a distance $b$ from the center of gravity. The thrusters 102 and 104 are located equidistant from the longitudinal center line of the vessel. The same is true of the rear thrusters 106 and 108. The distances $a$ and $b$ are important only in the proportioning respectively provided by blocks 18 and 24 or 22 and 30. This information must be taken into account since the same amount of rotation from an idle position with a given amount of thrust for thruster 102 will have less effect than this amount from thruster 106 due to the longer moment arm of 106.

Figure 3:
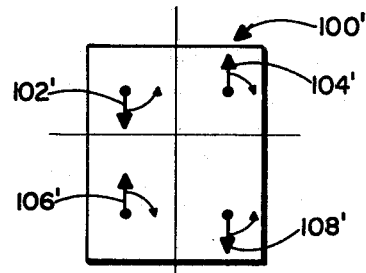
Figure 4:
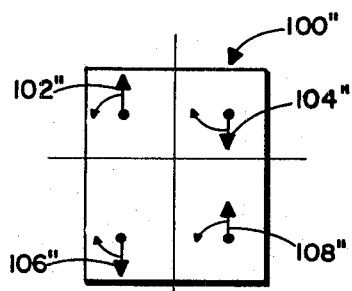

FIGS. 3 and 4 are in general substantially the same as FIG. 2 except that they show different positionings of the thrusters. In FIG. 3 the unit 100' has the thrusters numbered substantially the same as FIG. 2 except that they have a "prime." As will be noted, each of the thrusters can be reoriented toward the right. Thus there are two different idle conditions at which the vessel will remain stationary and from which the thrusters can be reoriented to move the vessel to the left with the thrust in a maximum condition all being generated to the right. The switch 36 in FIG. 1 accomplishes the necessary change in operating for the various components so that, as will be explained more thoroughly later, the propulsion units need not be rotated 180° every time there is an abrupt change desired in direction.

FIG. 4 shows a platform 100'' with the thrusters again similarly numbered. Again, this positioning of the thrusters is shown to aid in the description of operation. As will be noted, the thruster directions at idle are the same as for FIG. 2 and merely have opposite directions of rotation. In this case, if the platform is moving slowly to the left with the thrusters shown in FIG. 2 oriented slightly to the right of the positions shown, and the platform passes over a given reference point, the thrusters can rotate 180° degrees to bring the boat back to the reference point. However, the present invention in some embodiments utilizes a reversing switch 36 so that the thrusters can rotate in the opposite directions as shown in FIG. 4 to provide continuous rather than discontinuous control of the vessel.

OPERATION

In operation a signal applied to servo receiver 68 will be transmitted to motor 66 to reposition the shaft 56 in a vertical direction. Moving the shaft 56 in a vertical direction causes movement of the arm 58 along the cam 60. This results in rotation of the shaft 56 in addition to its vertical movement. The springs 62 will tend to resist this movement and attempt to bring it back to the normal right angle position. In the position shown with no thrust requested the bridge circuit 88 is balanced so that there is no output to the thruster 84. Accordingly, the thruster operates at idle thrust. However, when shaft 56 rotates with respect to the main drum 52 there will be rotation of gear 82, thus unbalancing bridge circuit 88 through a change in impedance of potentiometer 78. This will cause an output to be applied to the thruster 84 so as to change its speed of operation. Since the shaft 56 rotates as it is moved vertically in response to a request for more thrust the angle of thrust will change from the idle condition. As shown, the thruster can rotate 90° either way from its normal or idle position.

Figure 5:
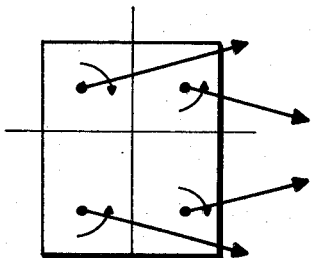

As shown in FIGS. 2—4, the idle position of each thruster is in the direction of its arrow and the thrusters will all increase in thrust as shown by the vectors of FIG. 5 when they are rotated as indicated by the arrowed arcs. In FIG. 5 the thrusters are producing near maximum thrust to the right thus moving the vessel at a near maximum rate to the left. By reducing both the magnitude of thrust and the angle of rotation slightly of the rear thrusters while increasing the angle and magnitude of thrust slightly on the forward thrusters the vessel can be caused to rotate while moving to the left.

Figure 6:
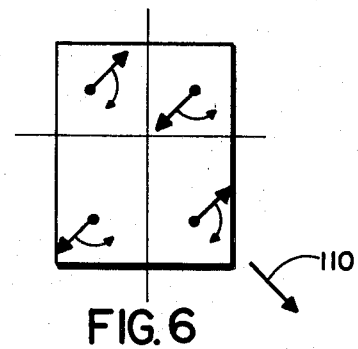

An input signal to synchroreceiver 46 will cause rotation of the gear 54 and drum 52 along with the thruster 84 with respect to their idle positions. In the idle position, the thrusters are always all at right angles to the desired direction of maximum travel and are positioned such that each thruster opposes the thrust of the two adjacent thrusters. FIG. 5 is shown with the thrusters in the position to move the boat or vessel the maximum amount to the left. In FIG. 6 the thrusters are all shown in their idle conditions. However, if the thrusters are reoriented as indicated by the arrowed arcs the vessel will move at a maximum rate in the direction shown by the thrust arrow 110. Likewise, in FIG. 4 if the thrusters are reoriented as indicated by the arrowed arcs maximum thrust will be produced in the right hand direction.

As may thus be determined, the various signals from the reference generator 10 are supplied to the summing networks and from there the signals are proportioned for application to the squaring blocks 32 and 34 to determine the magnitude of thrust to be supplied by the thrusters. The moment block 16 supplies a signal to blocks 24 and 30. The signal from block 16 has opposite effects on blocks 24 and 30 such that it is added to one Y signal and subtracted from the other to obtain a differential effect on direction and thrust magnitude of the thrusters. As mentioned previously, for the control logic and thruster configuration shown in FIG. 2, an increased thrust magnitude and increased angle from idle at the front set of thrusters combined with a decreased angle and decreased magnitude of thrust at the rear set of thrusters will cause the vessel to rotate in a counterclockwise direction. For the setup shown in FIG. 4 the vessel will of course rotate in a clockwise direction. Conversely, for the setup shown in FIG. 2 the opposite combination of front and rear thrust magnitude and angle deviations would cause a clockwise direction of rotation.

It is very seldom that the vessel will have to be rotated in an environment where no other thrust components are required. This is because there will normally be wind or water currents which will exert forces on the vessel. However, such a stationary rotation may be accomplished by using a manual portion of switch 36 to change the logic of only one set of thrusters, such as the forward units, while keeping the logic of the other set the same. With the new logic, thrust can be applied to rotate the vessel. When the vessel is properly rotated, the switch 36 must be returned to its original position so that the four thrusters can again work in unison for moving the vessel in translation.

The angle information obtained from blocks 26 and 28 is based on the formula $$\psi F = \cos^{-1}\left[\frac{F_x}{\sqrt{F_x^2 + F_y^2}}\right]$$

which merely indicates that the angle information can be obtained by dividing the adjacent leg of a vector triangle by the hypotenuse resultant and determining what angle that dividend is the cosine of. The output of block 32 is the square root of the sum of the squares of X and Y inputs and thus corresponds to the hypotenuse of a triangle having the X vector component for one leg and the Y vector component for the other leg. This division process is more completely described in the above-referenced application although it can be obtained in different ways as is well known in the prior art. The angle information from the blocks 26 and 28 is, of course, used in the synchroreceivers within a thruster block to position the thruster at the desired angle such that at idle it is normal to the desired direction of vessel movement.

The polarity check unit 20 receives the X and Y summed inputs and operates to switch circuit 36 whenever one or both of the inputs changes in polarity. In other words, when the X or Y vectors change from positive to negative an output is obtained from the polarity check circuit 20 to actuate the switch 36. An example was previously given with respect to FIGS. 2 and 4 why such a function is desirable. The switch 36 may of course be manual and operated by a pilot in a nonautomatic system so that the thrusters can be rotated if so desired or can merely have their logic inputs switched to easily transfer from the vessel movements in one direction to vessel movements in the opposite direction. As previously explained, the switch 36 is also useful where rotation without translation is desired. However, the most normal usage of this logic circuit will be where, as previously mentioned, the vessel is approaching a reference point and passes over that point so that the thrusters must reverse their thrust to return the vessel to the referenced point.

Although the apparatus of this application has been described, for the purposes of simplicity, as involving the positioning of the thrusters normal to the desired direction of vessel movement for each change of vessel movement direction, there is no reason why the thruster magnitude need be returned to idle to accomplish the repositioning of the thrusters. All that need be done is to supply the input error signals and the thrusters will automatically seek new positions corresponding to the amount of thrust and direction from what would be its idle condition.

The concept of this invention has been described primarily in conjunction with a vessel on the surface of the water. However, the concept may be applied to any vessel operating in a fluid. Thus, submarines and space stations would be included.

While the inventive concept has been shown using simple components, it is realized that many other methods of implementation are available.

We claim:

1. Apparatus for use in positioning a vessel utilizing two pairs of thrusters, each pair comprising units mounted on opposite sides of a center line of the vessel, one pair being forward and the other aft of the center of gravity of the vessel where the minimum thrust of the thrusters cannot be reduced below a predetermined value comprising, in combination:
   first means for rotating the pairs of thrusters simultaneously in response to a first input signal so that at idle the thrust direction of each thruster pair is normal to its commanded thrust direction;
   second means for rotating each thruster as a function of and in response to a second input signal from the normal position at idle to substantially parallel the commanded thrust direction for that pair at a maximum thrust condition; and
   vessel control means for supplying first and second signals to said first and second means respectively and for supplying a thrust magnitude signal for application to said pairs of thrusters.

2. Apparatus as claimed in claim 1 wherein said commanded thrust direction is substantially parallel to the desired direction of vessel movement and deviates therefrom as a function of the respective distance of a given pair from the vessel's center of rotation, and wherein said vessel control means additionally comprises means for differentially adding a control signal to said front and rear pairs of thrusters for inducing rotation of the vessel about its center of gravity.

3. Apparatus as claimed in claim 1 wherein said second means includes means for increasing the thrust as a function of movement of the thruster from the normal position.

4. The method of dynamically positioning a vessel using two pairs of thrusters comprising the steps of:
   first positioning the thrusters at idle substantially normal to the desired direction of movement wherein the front pair of thrusters supplies their idle thrusts in opposing directions and the rear pair does likewise; and
   then simultaneously increasing the thrust magnitude above idle and the thruster angle from said substantially normal positions of all thrusters when movement of the vessel is desired.

5. The method of dynamically positioning a vessel for turning on its center of gravity comprising the steps of claim 4 with the additional step of decreasing thrust and angle from said substantially normal position of one pair of thrusters while increasing the thrust and angle from said substantially normal position of the other pair of thrusters.

6. Apparatus for dynamically positioning a vessel utilizing a first pair of thrusters aft of the center of gravity thereof and on opposite sides of a center line of the vessel and utilizing a second pair of thrusters forward of the center of gravity and on opposite sides of the center line, where the minimum thrust of the thrusters cannot be reduced below a predetermined minimum thrust and wherein the units of each pair are mounted to produce thrust in opposite directions during idle conditions comprising, in combination:
   first means for initially positioning the two pairs of thrusters simultaneously in response to a first input signal so that their idle thrust components are substantially normal to the desired direction of vessel movement;
   second and third means for rotating said first and second pairs of thrusters respectively from the said substantially normal position at idle toward a line which is substantially parallel the desired direction of vessel movement in response to second and third signals respectively;
   fourth and fifth means connected to said first and second pairs of thrusters respectively for increasing the magnitude of thrust of said thrusters in response to fourth and fifth signals respectively; and
   control means for supplying signals to said first, second, third, fourth and fifth means for positioning said thrusters substantially normal to the desired direction of vessel movement at idle and for increasing the magnitude of thrust for movement of the vessel at positions of the thrusters other than idle.

7. Apparatus as claimed in claim 6 wherein said control means includes means for increasing said second signal while decreasing said third signal to achieve rotation of the vessel.

8. Apparatus as claimed in claim 6 wherein said control means includes means for increasing said fourth signal while decreasing said fifth signal to achieve rotation of the vessel.

9. Apparatus of the class described comprising, in combination:
   a vessel;
   a first pair of thrusters mounted on opposite sides of a center line of said vessel and at a distance $a$ forward of the center of gravity of said vessel;
   a second pair of thrusters mounted on opposite sides of the center line of said vessel at a distance $b$ aft of the center of gravity of said vessel;
   first means for rotating the pairs of thrusters simultaneously in response to a first input signal so that at idle the thrust direction of each thruster is substantially normal to the desired direction of vessel movement and deviates therefrom as a function of the ratio of $a$ to $b$;
   second means for rotating each thruster as a function of and in response to a second input signal from the substantially normal position at idle to substantially parallel the desired direction of vessel movement at a maximum thrust condition; and
   vessel control means for supplying first and second signals to said first and second means respectively and for supplying a thrust magnitude signal for application to said pairs of thrusters.

10. Apparatus as claimed in claim 1 wherein said vessel control means additionally comprises means for changing the direction of rotation of at least one of the pairs of thrusters from their idle positions upon application of the second input signals.